US011204297B2

(12) United States Patent
Brinckmann et al.

(10) Patent No.: US 11,204,297 B2
(45) Date of Patent: Dec. 21, 2021

(54) METHOD FOR DETERMINING WHETHER A SEALING AREA OF A PRIMARY PACKAGING CONTAINER FOR AN OPHTHALMIC LENS IS UNACCEPTABLE FOR PROPERLY SEALING A FOIL THERETO

(71) Applicant: ALCON INC., Fribourg (CH)

(72) Inventors: Felix Brinckmann, Rossdorf (DE); Gabriela Cocora, Aschaffenburg (DE); Nils Schweizer, Bad Konig (DE); Jens Wolfstaedter, Kleinwallstadt (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/893,911

(22) Filed: Jun. 5, 2020

(65) Prior Publication Data
US 2020/0386647 A1 Dec. 10, 2020

Related U.S. Application Data

(60) Provisional application No. 62/858,557, filed on Jun. 7, 2019.

(51) Int. Cl.
| G01M 3/00 | (2006.01) |
| H04N 5/232 | (2006.01) |
| B65B 25/00 | (2006.01) |
| B65B 57/00 | (2006.01) |
| G01J 5/00 | (2006.01) |
| G01M 3/38 | (2006.01) |
| G06T 7/00 | (2017.01) |
| H04N 5/225 | (2006.01) |
| H04N 5/247 | (2006.01) |

(52) U.S. Cl.
CPC ............ *G01M 3/002* (2013.01); *B65B 25/008* (2013.01); *B65B 57/00* (2013.01); *G01J 5/00* (2013.01); *G01M 3/38* (2013.01); *G06T 7/0004* (2013.01); *H04N 5/2253* (2013.01); *H04N 5/23299* (2018.08); *H04N 5/247* (2013.01); *G01J 2005/0077* (2013.01); *G06T 2207/10048* (2013.01)

(58) Field of Classification Search
None
See application file for complete search history.

(56) References Cited

U.S. PATENT DOCUMENTS

| 2005/0284102 | A1 | 12/2005 | Herzog | |
| 2006/0288663 | A1* | 12/2006 | Herzog | ............ B29C 66/72321 53/478 |
| 2007/0237201 | A1* | 10/2007 | Ignatowicz | ......... B29C 66/1122 374/7 |

(Continued)

FOREIGN PATENT DOCUMENTS

| CN | 105921421 A | * | 9/2016 |
| EP | 1109011 A1 | | 6/2001 |

(Continued)

*Primary Examiner* — Stefan Gadomski

(57) ABSTRACT

A method for determining whether a sealing area of a primary packaging container for an ophthalmic lens is unacceptable for properly sealing a foil to the sealing area is disclosed. The method involves comparing the temperature of an infrared image of the sealing area to a reference temperature to determine if the difference in temperature exceeds a predetermined threshold.

11 Claims, 5 Drawing Sheets

(56) References Cited

U.S. PATENT DOCUMENTS

| | | | | |
|---|---|---|---|---|
| 2008/0022632 A1* | 1/2008 | Gysi | ................ | B29C 66/72341 |
| | | | | 53/377.7 |
| 2010/0035739 A1* | 2/2010 | Gysi | ................ | B21D 51/446 |
| | | | | 493/52 |
| 2012/0267534 A1* | 10/2012 | Ijuin | ................ | G01N 21/35 |
| | | | | 250/341.8 |
| 2014/0168374 A1* | 6/2014 | Bunkers | ................ | B64F 1/368 |
| | | | | 348/46 |
| 2015/0028860 A1* | 1/2015 | Bravo | ................ | B29C 66/929 |
| | | | | 324/207.15 |
| 2015/0177070 A1* | 6/2015 | Maes | ................ | G01J 5/12 |
| | | | | 374/121 |
| 2016/0054245 A1* | 2/2016 | Weinstein | ................ | G01N 25/72 |
| | | | | 250/339.14 |
| 2016/0258880 A1* | 9/2016 | Smorgon | ................ | H04N 5/33 |
| 2016/0314573 A1* | 10/2016 | Salisbury | ................ | G01J 5/089 |
| 2017/0003172 A1* | 1/2017 | Maes | ................ | G01J 5/14 |
| 2017/0011507 A1* | 1/2017 | Wong | ................ | H04N 5/332 |
| 2018/0232870 A1* | 8/2018 | Jo | ................ | G01N 25/72 |
| 2019/0113398 A1* | 4/2019 | Comas | ................ | G01J 5/041 |
| 2019/0193877 A1* | 6/2019 | Choi | ................ | B65B 7/01 |
| 2019/0195724 A1* | 6/2019 | Jo | ................ | G01J 5/026 |
| 2019/0279350 A1* | 9/2019 | Taguchi | ................ | B32B 15/20 |
| 2019/0339159 A1* | 11/2019 | Israelsen | ................ | G01J 5/522 |

FOREIGN PATENT DOCUMENTS

| | | | |
|---|---|---|---|
| IN | 201721007306 A | * | 12/2020 |
| WO | 2017098357 A1 | | 6/2017 |

* cited by examiner

METHOD FOR DETERMINING WHETHER A SEALING AREA OF A PRIMARY PACKAGING CONTAINER FOR AN OPHTHALMIC LENS IS UNACCEPTABLE FOR PROPERLY SEALING A FOIL THERETO

FIELD

The present invention relates to a method for determining whether a sealing area of a primary packaging container for an ophthalmic lens is unacceptable for properly sealing a foil thereto.

BACKGROUND

In the production of ophthalmic lenses, in particular contact lenses such as soft contact lenses, those soft contact lenses that have successfully passed inspection are typically placed into the bowl of a primary packaging container which is made from a plastic material, for example polypropylene, and to which a cover foil is sealable. A storage and/or preservation liquid, for example saline with or without additional components, is then dispensed into the bowl. Thereafter, a cover foil is placed on the top surface of the primary packaging container, and the cover foil is subsequently sealed, for example heat-sealed, along a sealing area on the top surface of the primary packaging container. The sealing area completely surrounds the opening of the bowl in the plane of the top surface of the container, so that and once the foil has been sealed along the sealing area the soft contact lens and the storage and/or preservation liquid contained in the bowl are properly closed. Such properly closed primary package (or a strip of such packages which are connected by a strip of cover foil sealed to the individual packages of the strip) may then be introduced into a secondary packaging (e.g. made of carton) for shipping. An example of such primary packaging container as well as the process of sealing a foil along the sealing area on the top surface of the primary packaging container is described, for example, in WO 2017/098357.

Although this may happen extremely rarely, it may occur that during placement of the soft contact lens into the bowl of the primary packaging container, the lens is not sufficiently accurately placed into the bowl, or that for some other reason the soft contact lens becomes misplaced in a manner such that at least a portion of the soft contact lens comes to lie on the sealing area and is subsequently getting sealed between the foil and the top surface of the primary packaging container so that the contact lens is irreversibly damaged. Also, it may happen that an amount of storage and/or preservation liquid is inadvertently dispensed onto the sealing area, or for some other reason may come to rest on the sealing area. Such liquid may lead to an improper seal being formed between the cover foil and the top surface of the primary packaging container. In either situation, the sealing area of the primary packaging container is unacceptable for properly sealing the foil to the primary packaging container.

It is therefore an object of the invention to suggest suitable measures which, in occurrences like the ones described above, allow for preventing that primary packaging containers are getting shipped which may be improperly closed (due to an improper seal being formed between the cover foil and the top surface of the primary packaging container) or which may have a contact lens sealed between the cover foil and the top surface of the container, as it is not acceptable that such a primary packaging container may ultimately reach the customer.

SUMMARY

This object is achieved by a method according to the invention as it is specified by the features of the independent claim. Advantageous aspects of the method are the subject of the dependent claims.

The present invention suggests a method for determining whether a sealing area of a primary packaging container for an ophthalmic lens, for example a contact lens such as a soft contact lens, is unacceptable for properly sealing a foil to the sealing area that completely surrounds an opening of a bowl of the primary packaging container, with the bowl containing a liquid.

The method comprises the steps of
  taking an infrared image of the primary packaging container using an infrared camera;
  determining in the infrared image a plurality of individual pixels which are arranged along an area corresponding to the sealing area of the primary packaging container, the plurality of individual pixels together essentially covering the area corresponding to the sealing area;
  determining from the infrared image the temperature of the individual pixels, and
  determining that the sealing area of the primary packaging container is unacceptable for properly sealing the foil thereto in case the following conditions are fulfilled:
a) the temperature of each individual pixel of a predetermined number of coherently arranged individual pixels is lower than a reference temperature, and
b) the difference between the temperature of each individual pixel of the predetermined number of coherently arranged individual pixels having the lowest temperature and the reference temperature exceeds a predetermined threshold.

According to a further aspect of the method according to the invention, the method may further comprise the steps of
  determining from the infrared image the temperature of the liquid contained in the bowl of the primary packaging container, and
  using the temperature of the liquid contained in the bowl of the primary packaging container as the reference temperature.

According to a further aspect of the method according to the invention, the method may further comprise the step of defining a plurality of individual regions of interest which are arranged in a pattern along the area corresponding to the sealing area such that the pattern essentially covers the area corresponding to the sealing area, with each individual region of interest of the plurality of individual regions of interest comprising a predetermined number of the plurality of individual pixels. The step of determining that the sealing area of the primary packaging container is unacceptable for properly sealing the foil thereto may comprise
  concurrently determining in a plurality of the individual regions of interest of the pattern whether conditions a) and b) are fulfilled for the predetermined number of pixels comprised by each of the plurality of individual regions of interest, and
  determining that the sealing area of the primary packaging container is unacceptable for properly sealing the foil thereto once in a predetermined number of coherent individual regions of interest it has been determined that conditions a) and b) are fulfilled.

According to yet a further aspect of the method according to the invention, the predetermined number of pixels comprised by each individual region of interest may be nine or higher.

According to still a further aspect of the method according to the invention, the threshold for the difference between the temperature of each individual pixel of the predetermined number of coherently arranged individual pixels and the reference temperature is at least 1° C., in particular at least 2° C.

According to a further aspect of the method according to the invention, the temperature of the respective individual pixels as well as the reference temperature is assigned a respective gray scale level by the infrared camera, the respective gray scale level representing the temperature of the respective individual pixels or the reference temperature, respectively. The sealing area of the primary packaging container may be determined to be unacceptable for properly sealing the foil thereto in case the difference in gray scale levels between that gray scale level representing the reference temperature and those gray scale levels representing the temperatures of the coherently arranged individual pixels exceeds a predetermined difference in gray scale levels representing the threshold.

According to yet a further aspect of the method according to the invention, the method may further comprise the steps of
arranging a plurality of the primary packaging containers on a carrier;
transporting the carrier with the plurality of the primary packaging containers arranged thereon along a track to a sealing area inspection station;
interrupting transportation of the carrier once the carrier has reached the sealing area inspection station where the infrared camera is fixedly arranged above the track and has a field of view extending over the plurality of primary packaging containers arranged on the carrier in the sealing area inspection station; and
simultaneously taking an infrared image of the plurality of primary packaging containers arranged on the carrier in the sealing area inspection station using the fixedly arranged infrared camera.

According to a further aspect of the method according to the invention, a plurality of the said carriers may be arranged on a plurality of parallel running tracks, wherein on each individual carrier of the plurality of carriers a said plurality of primary packaging containers may be arranged, and wherein the infrared camera fixedly arranged in the sealing area inspection station may have a field of view extending over all of the said primary packaging containers arranged on all of the said carriers arranged in the sealing area inspection station. The method further may comprise the steps of
transporting the individual carriers of the plurality of carriers on the plurality of parallel running tracks until a predetermined number of said individual carriers has reached the sealing area inspection station on the parallel running tracks, and
simultaneously taking an infrared image of all primary packaging containers arranged on all carriers arranged in the sealing area inspection station using the fixedly arranged infrared camera.

According to still a further aspect of the method according to the invention, the method may further comprise the steps of
arranging a plurality of the primary packaging containers on a carrier;
transporting the carrier with the plurality of the primary packaging containers arranged thereon along a track to a sealing area inspection station where the infrared camera is movably arranged above the track;
interrupting transportation of the carrier once the carrier has reached the sealing area inspection station;
moving the infrared camera along the carrier and consecutively taking an infrared image of each of the primary packaging containers arranged on the carrier.

According to yet a further aspect of the method according to the invention, a plurality of the said carriers may be arranged on a plurality of parallel running tracks, wherein on each of the said carriers a said plurality of primary packaging containers may be arranged. A plurality of infrared cameras may be arranged in the sealing area inspection station, one said infrared camera above each of the plurality of parallel running tracks. The method may further comprise the steps of
transporting the plurality of carriers on the plurality of parallel running tracks until a said carrier of the plurality of carriers has reached the sealing area inspection station on a said track of the plurality of parallel running tracks;
moving the respective infrared camera arranged above the said track along the said carrier that has reached the sealing area inspection station on the said track, and consecutively taking an infrared image of each of the primary packaging containers arranged on the said carrier.

According to still a further aspect of the method according to the invention, the method may further comprise the steps of
arranging a plurality of carriers on a plurality of parallel running tracks, each of the said carriers of the plurality of carriers having a plurality of the said primary packaging containers arranged thereon;
transporting the plurality of carriers with the said primary packaging containers arranged thereon on the plurality of parallel running tracks to a sealing area inspection station;
interrupting transportation of a said carrier of the plurality of carriers once the said carrier has reached the sealing area inspection station where at least one said infrared camera is movably arranged above the plurality of parallel running tracks;
once a predetermined number of said carriers has reached the sealing area inspection station on different ones of the plurality of parallel running tracks, moving the at least one infrared camera in a direction transverse to the parallel running tracks over the primary packing containers arranged on the predetermined number of said carriers arranged in the sealing area inspection station and consecutively taking an infrared image of each of the individual primary packaging containers arranged on the different carriers across which the at least one infrared camera is moved.

In accordance with the invention, an infrared image of the primary packaging container is taken using an infrared camera. In the infrared image taken with the said infrared camera a plurality of individual pixels is determined which are arranged along an area corresponding to the sealing are of the primary packaging container. These individual pixels are arranged such that they essentially cover the area corresponding to the sealing area, but they may not necessarily comprise all pixels that correspond to the whole sealing area. In this regard, the term "essentially cover an area corresponding to the sealing area" means that the pixels cover an area that includes at least 80% of the sealing area (with the remaining at maximum 20% of the sealing area not covered by the pixels being evenly distributed along the sealing area), however, the pixels may even cover an area up to 100% of the sealing area. For each individual pixel of the said plurality of individual pixels the temperature of the respective individual pixel is determined from the said infrared image. The sealing area of the primary package is then determined unacceptable for properly sealing a foil thereto in case a) the temperature of the individual pixels of a predetermined number of coherently arranged individual pixels is lower than a reference temperature, and b) the difference between the temperature of each individual pixel of the predetermined number of coherently arranged individual pixels and the reference temperature exceeds a predetermined threshold.

'Coherently arranged' in this regard is to be understood such that these individual pixels are arranged directly adjacent to one another to form a continuous area of pixels.

Accordingly, condition a) above means that there must be a continuous area of pixels having a number that is equal to or exceeds a predetermined number of pixels, with each pixel of that continuous area of pixels having a temperature lower than a reference temperature.

Condition b) means that the difference between the temperature of each of these pixels and the reference temperature is greater than a predetermined difference in temperature (the temperature of this pixel must be 'colder' than the reference temperature by more than the predetermined temperature difference, and this predetermined temperature difference is the threshold that must be exceeded).

The predetermined number of coherently arranged individual pixels may represent either storage and/or preservation liquid (e.g. a droplet) located on the sealing area, or may represent a portion of a soft contact lens which is located on the sealing area and on which some storage and/or preservation liquid may be present. Due to evaporation of such storage and/or preservation liquid to the ambient air the temperature at the location of the liquid decreases. This decrease in temperature occurs comparatively quick as the volume of the said liquid (e.g. droplet) in relation to the surface of the said liquid (e.g. droplet) is small, at least when compared with the large volume of liquid contained in the bowl of the primary packaging container in relation to the surface of the liquid contained in the bowl. Accordingly, the temperature of the liquid contained in the bowl decreases significantly slower than the temperature of any liquid inadvertently located on the sealing area or on a portion of the soft contact lens inadvertently resting on the sealing area. This is in particular so, since the dispensing of the liquid into the bowl occurs only a short time before the determination is made whether the sealing area is unacceptable, so that the temperature of any liquid on the sealing area or on a portion of the soft contact lens resting on the sealing area is considerably lower than the temperature of the liquid contained in the bowl.

In accordance with one aspect of the method according to the invention, it is therefore possible to either set the reference temperature to a suitable constant reference temperature (for example, this constant reference temperature may be the temperature of the liquid at the time it is dispensed into the bowl, this temperature being known as the liquid is taken from a reservoir of liquid the temperature of which is known as the temperature in a contact lens manufacturing line including the packaging line is kept constant). In accordance with another aspect of the method according to the invention, the temperature of the liquid contained in the bowl of the individual primary packaging container may be determined from the infrared image and may be used as the reference temperature for the respective individual primary packaging container. Since the temperature of a droplet on the sealing area or on a portion of the soft contact lens resting on the sealing area is considerably lower (for the reasons set out above) this allows for an improved dynamic setting of the reference temperature for each individual primary packaging container (by determining the actual temperature of the storage and/or preservation liquid contained in the bowl) while at the same time allowing for a reliable determination that the sealing area is unacceptable.

Accordingly, the method according to the invention offers a number of advantages. For example, it allows to reliably determine whether an ophthalmic lens, in particular a contact lens such as a soft contact lens, is arranged such that at least a portion of the soft contact lens is resting on the sealing area at the time the determination is performed, so that the portion of the soft contact lens may subsequently get sealed between the cover foil and the top surface of the primary packaging container. In such a situation where the sealing area has at least a portion of the contact lens resting upon it, the sealing area of the primary packaging container is regarded as unacceptable for properly sealing the foil to the primary packaging container. And although the result may not necessarily be that the lens is actually getting sealed between the cover foil and the top surface of the container (for example, the lens may possibly slip back into the bowl before the sealing step is performed) the risk must be excluded that a primary packaging container may possibly be shipped to the customer with a lens being sealed between the cover foil and the top surface. The method further allows for determining whether too large an amount of storage and/or preservation liquid (e.g. one or more droplets of storage and/or preservation liquid) rests on the sealing area, the amount being sufficiently large to possibly result in an improper seal being formed between the cover foil and the top surface of the primary packaging container. Again, although the result may not necessarily be an imperfect seal the risk must be excluded that an improperly sealed primary packaging container containing a lens is possibly being shipped to the customer. Accordingly, in both scenarios (portion of the lens rests on the sealing area, too large an amount of liquid rests on the sealing area), the sealing area of the primary packaging container is unacceptable for properly sealing the foil to the primary packaging container, and therefore the primary packaging container (or in case of a strip, the strip comprising the unacceptable primary packaging container) is sorted out and discarded.

While the sorting out may generally occur at the sealing area inspection station where it has been determined that the sealing area is unacceptable for properly sealing the foil thereto (i.e. not further downstream in the packaging line), it may well occur further downstream in the packaging line. This means that the sealing step (and possibly additional packaging steps, such as laser printing of the foil, etc.) may actually be performed although the primary packaging container (or the respective strip comprising the said primary packaging container) is sorted out further downstream at a suitable station of the packaging line.

Also, while not being mandatory the determination whether the sealing area is unacceptable may occur in the sealing station of the packaging line (in case inspection of the sealing area is performed in the same station where the foil is placed on the top surface of the primary packaging container and is sealed to the top surface, but before the foil is place on the top surface) so that the primary packaging container is not moved anymore after the said determination has been made and before the sealing step is performed. This may help preventing that storage and/or preservation liquid is inadvertently getting spilled onto the sealing area after the determination has been made whether the sealing area is unacceptable, for example during transportation of the primary packaging container from a sealing area in inspection station to a sealing station. And although such inadvertent spilling during transportation may occur only extremely rarely, the low risk that the sealing area actually becomes unacceptable before the sealing step is performed although in the determination step the sealing area has been determined not to be unacceptable may thus be eliminated.

In case a plurality of individual regions of interest are defined which are arranged in a pattern along the area corresponding to the sealing area such that the pattern essentially covers the area corresponding to the sealing area, this aspect offers a further advantage. In this case, multiple such individual regions of interest can be evaluated concurrently. That is to say, in each of the individual regions it can be concurrently determined whether the conditions a) and b) mentioned above are fulfilled. Due to the concurrent evaluation of multiple individual regions of interest, the determination that the sealing area is unacceptable can be significantly accelerated, since in case in a predetermined number of concurrently evaluated individual regions of interest conditions a) and b) are fulfilled it is no longer necessary to evaluate the rest of the regions of interest. Once conditions a) and b) are fulfilled in a predetermined number of coherent regions of interest, evaluation can be stopped and it can be determined that the sealing area is unacceptable. While this predetermined number of coherent regions of interest may be only one, a predetermined number other than one may be chosen. By way of example, the individual regions of interest may have the shape of a square and may partially overlap. Also by way of example, the number of pixels comprised by each individual region of interest may be nine or higher so as to allow for a sufficiently high definition within each individual region of interest.

Generally, the threshold for the difference between the temperature of each of the coherently arranged individual pixels (continuous area of pixels) and the reference temperature is chosen such that it may be determined with sufficient certainty that either liquid or a portion of a contact lens is arranged on the sealing area. A suitable difference in temperature may be at least 1° C., in particular at least 2° C. In choosing the threshold, the typical time period between the time of dispensing the liquid into the bowl of the primary packaging container or the placement of the lens into the bowl and the time of taking the infrared image may be considered.

It may be advantageous if the temperature of each of the individual pixels as well as the reference temperature is converted by the infrared camera to a gray scale level representing the temperature of the individual pixels or the reference temperature, respectively, so that only gray scale levels may have to be compared and a determination may have to be made as to whether the difference between the gray scale level representing the lowest temperature of the coherently arranged pixels and the gray scale level representing the reference temperature exceeds a predetermined difference in gray scale levels representing the threshold for the temperature difference. This is advantageous with respect to simplification and acceleration of the evaluation procedure.

According to another advantageous aspect, a plurality of primary packaging containers may be arranged on a carrier which is transported along a track to a sealing area inspection station (of a packaging line) with the plurality of primary packaging containers arranged thereon. Once the carrier has reached the sealing area inspection station transportation is interrupted. In the sealing area inspection station the infrared camera may be fixedly arranged above the track. The infrared camera may have a field of view extending over the plurality of primary packaging container arranged on the carrier in the sealing area inspection station, so that one infrared image containing all primary packaging containers arranged on the carrier may be taken. This is an efficient manner of inspecting the sealing area of a plurality of primary packaging containers at the same time and reduces the time needed for the determination whether the sealing area of one or more of the primary packaging containers arranged on the carrier is unacceptable. By way of example and without limitation, a number of three, five or six primary packaging containers may be arranged on one carrier, and their sealing areas may thus be concurrently inspected.

According to another advantageous aspect, a plurality of such carriers may be arranged on a plurality of parallel running tracks, and on each such carrier a plurality of primary packaging containers may be arranged. The infrared camera fixedly arranged in the sealing area inspection station may have a field of view that extends over all primary packaging containers arranged on all carriers arranged in the sealing area inspection station. Accordingly, one infrared image containing all primary packaging containers carriers arranged on all carriers which are in the sealing are inspection station may be taken. It is not mandatory that all carriers on all tracks must be arranged in the sealing area inspection station before the infrared image may be taken, although this is particularly advantageous from the point of view of efficiency. However, it is also possible that an infrared image be taken at the time a number of carriers lower than the number of tracks are arranged in the sealing area inspection station, since even in this case the sealing areas of quite a number of primary packaging containers may be inspected at the same time.

According to another aspect, while still a plurality of primary packaging containers may be arranged on a carrier and be transported along a track to the sealing area inspection station, the infrared camera may be movably arranged above the track in the sealing area inspection station. Once the carrier has reached the sealing area inspection station and transportation of the carrier has been interrupted, the infrared camera is moved along the carrier and consecutively takes infrared images of the individual primary packaging containers arranged on the carrier. This can also be performed in a short time, but requires that the infrared camera be moved along the carrier.

Similarly, a plurality of such carriers may be arranged on a plurality of parallel running tracks, each carrier carrying a plurality of primary packaging containers. A corresponding plurality of infrared cameras is arranged in the sealing area inspection station, one infrared camera above each of the plurality of parallel running tracks. The plurality of carriers is transported on the plurality of parallel running tracks until a respective carrier on a said track has reached the sealing area inspection station where transportation of the respective carrier is interrupted. The infrared camera arranged above the respective track is then moved along the carrier and consecutively takes an infrared image of each of the primary packaging container arranged on the respective carrier. Also here, it is generally possible that inspection of the sealing areas is carried out once on each of the parallel running tracks a carrier has reached the sealing area inspection station. However, this is not mandatory. It is well conceivable and provides for more flexibility if the infrared images of the primary packages arranged on a particular carrier are taken once the particular carrier has reached the sealing area inspection station.

According to a further aspect, again a plurality of carriers are arranged on a plurality of parallel running tracks, with a plurality of primary packaging containers being arranged on each of the said carriers. These carriers are again transported along the parallel running tracks to the sealing area inspection station, and once a respective carrier has reached the sealing area inspection station transportation of the said carrier is interrupted. However, in accordance with this aspect a predetermined number of carriers must have reached the sealing area inspection station before infrared images are taken, since one or more infrared cameras are movably arranged in the sealing area inspection station above the parallel running tracks in a direction transverse to the parallel running tracks. That is to say, the infrared camera is moved across primary packaging containers which are arranged on different carriers (for example, the infrared camera is moved across the primary packaging containers which are arranged in the first position on the respective carriers arranged in the sealing area inspection station). While only one infrared camera may be provided which is consecutively moved in a direction transverse to the parallel running tracks across the primary packaging containers arranged on the different carriers (for example initially over those primary packaging containers which are arranged in the first position on the respective carriers, thereafter over those primary packaging containers which are arranged in the second position on the respective carriers, and so on), for efficiency reasons it may be advantageous if in the sealing area inspection station one infrared camera is provided for each of the positions on the carriers.

BRIEF DESCRIPTION OF THE DRAWINGS

Further advantageous aspects will become apparent from the following description of embodiments of the method according to the invention with the aid of the drawings in which.

DETAILED DESCRIPTION

Figure 1:
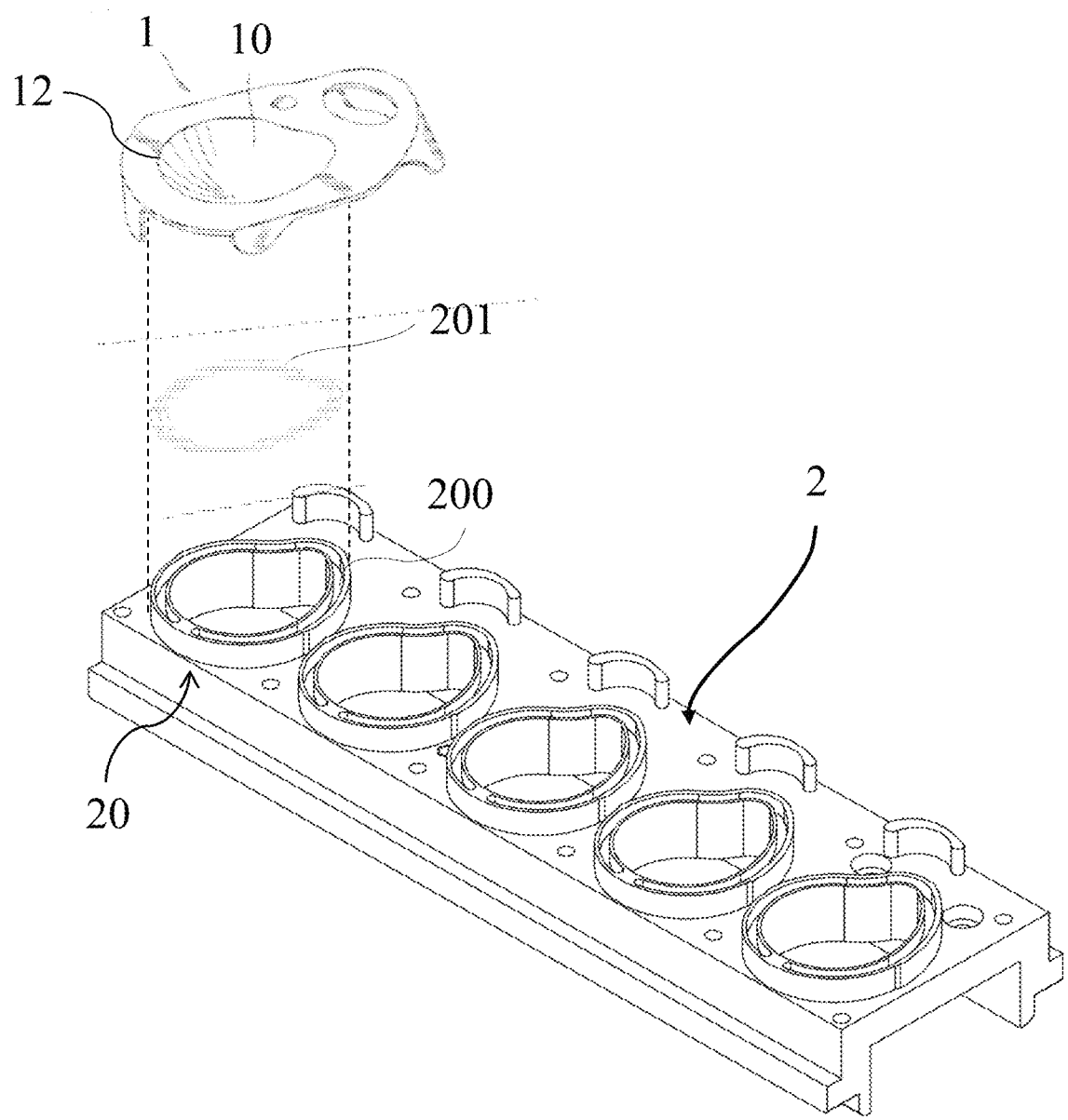
FIG. 1 shows a carrier for carrying a plurality of primary packaging containers having a bowl into which a soft contact lens can be placed and into which a storage and/or preservation liquid can be dispensed.

FIG. 1 shows an embodiment of a carrier 2 for carrying a plurality of primary packaging containers 1 having a bowl 10 into which a soft contact lens can be placed and into which a storage and/or preservation liquid can be dispensed. Carrier 2 is used for carrying the primary packaging containers in a packaging line and comprises a plurality of individual supporting structures 20 each having a groove 200 into which a flexible O-ring 201 can be placed. Flexible O-ring 201 allows for a very uniform application of sealing pressure to the sealing area of the primary packaging container 1 with the aid of a sealing stamp during the sealing step. The manner how flexible O-ring 201 is placed into groove 200 is evident from FIG. 1 and is described in more detail in WO 2017/098357. Primary packaging container 1 is placed on supporting structure 20 after flexible O-Ring 201 has been placed into groove 200. In the embodiment shown in FIG. 1, a plurality of five primary packaging containers 1 may be arranged on carrier 2.

A soft contact lens is placed into bowl 10 of each primary packaging container 1 arranged on carrier 2, and thereafter a predetermined amount of storage and/or preservation liquid is dispensed into each bowl 10. As is well-known in the art (see, for example, the afore-mentioned WO 2017/098357), an individual pre-cut cover foil (not shown) is subsequently placed on the top surface 11 of each primary packaging container 1 and subsequently sealed thereto in order to obtain individual sealed primary packaging containers 1, or a pre-cut strip of cover foil extending over all five primary packaging containers 1 arranged on carrier 2 is placed on the top surfaces 11 of primary packaging containers 1 to extend over all five primary packaging containers 1 and sealed thereto in order to obtain a strip of five primary packaging containers 1 which are connected to one another by the strip of cover foil. The cover foil is sealed along a sealing area to the top surface 11 of the respective primary packaging container 1 that completely surrounds the opening 12 of the bowl 10 to either form the individual sealed primary packaging containers 1 or to form the strip of sealed primary packaging containers 1. In any event, each sealed primary packaging container 1 contains a soft contact lens as well as the predetermined amount of storage and/or preservation liquid.

Figure 2:
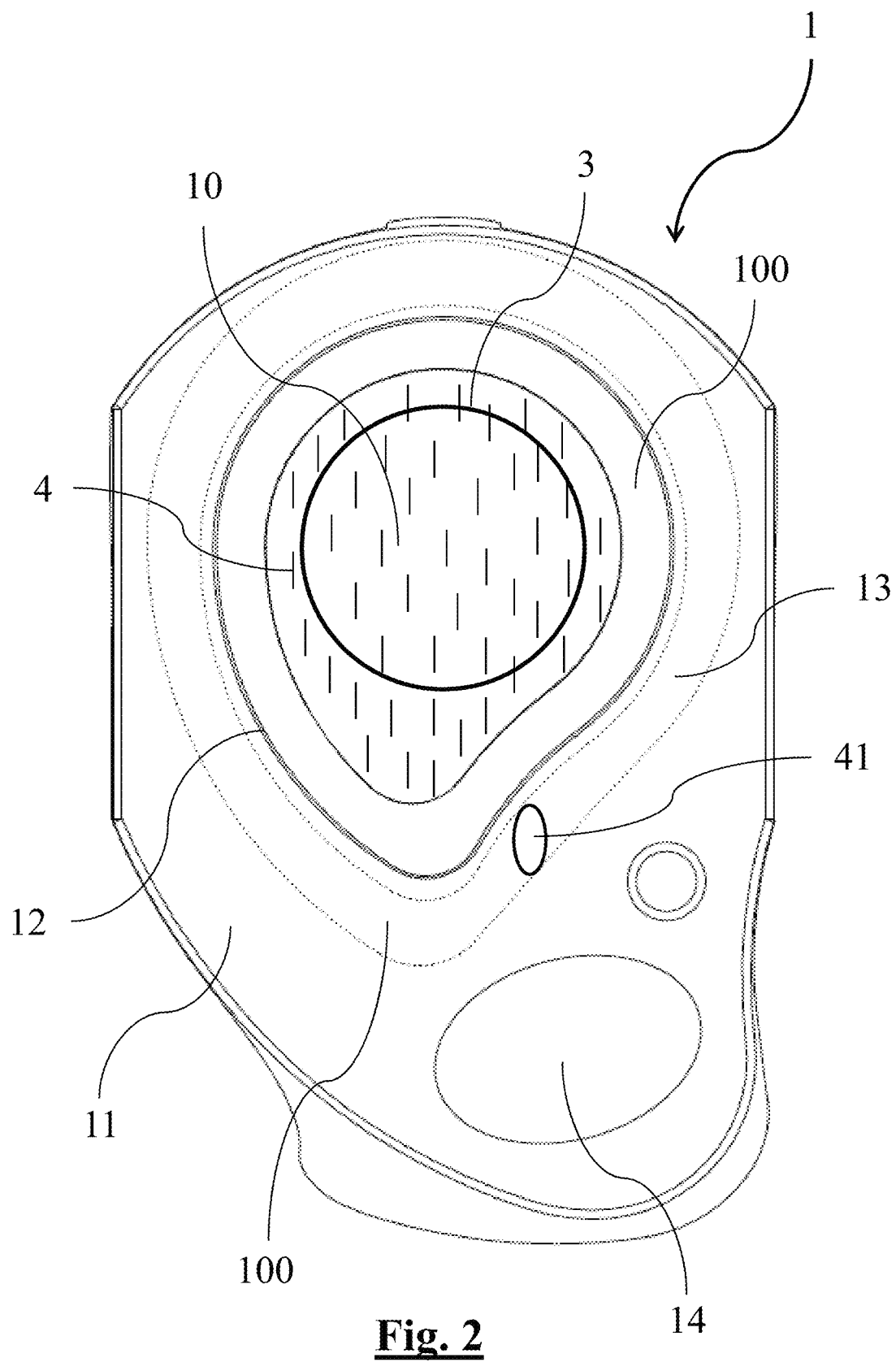
FIG. 2 shows a primary packaging container into which a soft contact lens has been placed and into which a storage and/or preservation liquid has been dispensed.

A primary packaging container 1 into which a contact lens 3 has been placed and into which a predetermined amount of storage and/or preservation liquid 4 has been dispensed is shown in FIG. 2. Also shown in FIG. 2 is the sealing area 13 (bounded by the dotted lines) on the top surface 11 of primary packaging container 1. As is evident, sealing area 13 completely surrounds the opening 12 of bowl 10. As is further evident, the bowl 10 of primary packaging container 1 comprises a ramped wall 100 that extends up to the top surface 11 of primary packaging container 1. Primary packaging container 1 further comprises a through-opening 14 that allows for an easy gripping and subsequent peeling off of the cover foil (not shown). In the state shown in FIG. 2—i.e. with the contact lens 3 and the storage and/or preservation liquid 4 contained in the bowl 10 of the respective primary packaging container 1, but without cover foil—the carrier 2 is transported to a sealing area inspection station of the packaging line. By way of example, a droplet 41 of storage and/or preservation liquid 4 is arranged on the sealing area 13.

Figure 3:
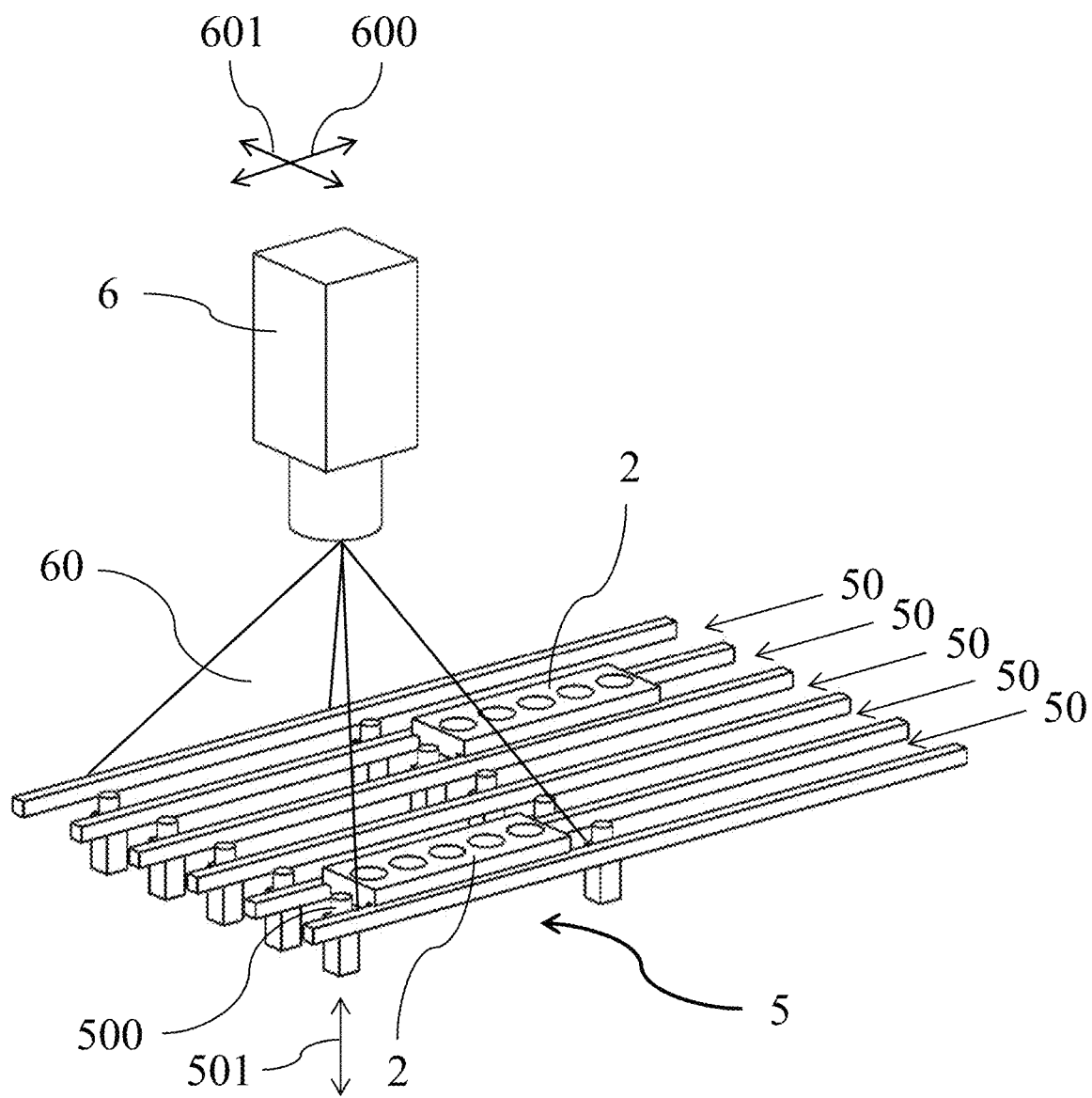
FIG. 3 shows a plurality of parallel running tracks (of a packaging line) along which a plurality of carriers carrying primary packaging containers each containing an ophthalmic lens and a liquid can be moved to a sealing area inspection station where an infrared camera is arranged above the parallel running tracks.

FIG. 3 shows a plurality of parallel running tracks 50 (of a packaging line) along which a plurality of carriers 2 carrying primary packaging containers 1 (not shown in FIG. 3) each containing an ophthalmic lens 3 and a storage and/or preservation liquid 4 (not shown in FIG. 3, either) are moved to a sealing area inspection station 5 where an infrared camera 6 is arranged above the parallel running tracks 50. In the embodiment shown in FIG. 3, five such parallel running tracks 50 are illustrated. However, any other suitable number is conceivable as well. For the sake of clarity, only one carrier 2 is shown in the sealing area inspection station 5, however, in the embodiment shown typically five such carriers 2 are concurrently arranged in the sealing area inspection station (one carrier 2 on each of the parallel running tracks 50).

In the embodiment shown in FIG. 3, the infrared camera 6 is fixedly arranged above the parallel running tracks 50 and has a field of view 60 that extends over all carriers 2 concurrently arranged in the sealing area inspection station 5 on the parallel running tracks 50 (and consequently over the primary packaging containers 1 arranged thereon each containing a soft contact lens 3 as well as the storage and/or preservation liquid 4, see FIG. 2). The carriers 2 with the primary packaging containers 1 arranged thereon are transported along the parallel running tracks 50 until they reach the sealing area inspection station 5 where further transportation of the carriers 2 along the tracks 50 is interrupted. In the embodiment shown, interruption of transportation is achieved with the aid of a stop 500 that is arranged in the respective track 50 in its upper position (shown in FIG. 3). In this upper position, the respective stop 500 prevents the respective carrier 2 from being transported further along the respective track 50. Once an infrared image of all primary packaging containers 1 arranged in the sealing area inspection station 5 has been taken with the aid of the infrared camera 6, stops 500 may be moved down to their lower position (see double-headed arrow 501 in FIG. 3) so that the carriers 2 may subsequently be transported out of the sealing area inspection station 5 for further processing in the packaging line.

As has been discussed above, in the embodiment shown in FIG. 3 there is only one infrared camera 6 which is fixedly arranged above the parallel running tracks 50 and which has a field of view that extends over all carriers 2 and the primary packaging containers 1 arranged thereon in the sealing area inspection station 5. This is particularly efficient since an infrared image of all primary packaging containers 1 on all carriers 2 arranged in the sealing area inspection station 5 can be taken concurrently.

However, alternative embodiments are conceivable as well. For example, it is conceivable that for each individual track 50 an individual infrared camera 6 is fixedly arranged above the respective individual track 50, so that the field of view of the respective infrared camera 6 arranged above the respective track 50 only needs to extend over the respective carrier 2 arranged on the respective track 50.

Alternatively, one or more infrared cameras 6 may be movably arranged above the parallel running tracks 50 in the sealing area inspection station 5. For example, the infrared camera or cameras may be movable in a direction 600 along (parallel to) the parallel running tracks 50, so that once the carriers 2 with the primary packaging containers 1 arranged thereon have reached the sealing area inspection station 5 and transportation of the carriers has been interrupted, the infrared images of the primary packaging containers 1 can be taken consecutively. For example, if one infrared camera 6 is provided for each track 50 the infrared camera 6 can be moved along that track 50 once the carrier 2 with the primary packaging containers 1 arranged thereon has reached the sealing area inspection station 5 and transportation of the carrier 2 has been interrupted. There is no need to wait until the carriers 2 arranged on the other tracks 50 have reached the sealing area inspection station 5 (in case transportation of the carriers 2 arranged on the various tracks is not performed synchronously). If only one infrared camera 6 is movably arranged in the sealing area inspection station, the field of view of this infrared camera 6 may extend transversely to the parallel running tracks 50 over all tracks 50 such that an image of all primary packaging containers 1 arranged in the leading position on the respective carriers 2 can be taken concurrently. Thereafter, the infrared camera 6 is moved in the direction 600 along the parallel running tracks 50 by one position, and an image of all primary packaging containers 1 arranged in the second position on the respective carriers 2 can be taken concurrently, and so on.

Alternatively, one or more infrared cameras 6 may be movable in a direction 601 transverse (perpendicular) to the parallel running tracks 50, so that once the carriers 2 with the primary packaging containers 1 arranged thereon have reached the sealing area inspection station 5 and transportation of the carriers 2 has been interrupted, the infrared images of the primary packaging containers 1 can again be taken consecutively. For example, if one infrared camera 6 is provided for each position on a carrier 2 where a primary packaging container 1 is arranged, the infrared cameras 6 may concurrently take an infrared image of the primary packaging container 1 arranged on a particular track 50 once the carrier has reached the sealing area inspection station 5 and transportation of the carrier 2 has been interrupted. Thereafter, the infrared cameras 6 can be moved in the direction 601 to the carrier 2 arranged on the next track 50. If only one infrared camera 6 is provided in the sealing area inspection station 5, the field of view of this infrared camera 6 may extend along the parallel running tracks 50 over all primary packaging containers 1 arranged on one particular carrier 2 such that an image of all primary packaging containers 1 arranged on that particular carrier 2 can be concurrently taken. Thereafter, the infrared camera 6 is moved in the direction 601 transverse to the parallel running tracks 50 to the carrier 2 arranged on the next track 50, and an image of all primary packaging containers 1 on the carrier 2 on the next track 50 can be taken concurrently, and so on.

It is even conceivable that one infrared camera 6 is provided in the sealing area inspection station 5 having a field of view that extends only over one individual primary packaging container 1. In this case, an infrared image of the respective individual primary packaging container 1 is taken, and thereafter the camera is moved to the next primary packaging container. Different movement patterns are then conceivable for the infrared camera 6, depending on how many carriers 2 are concurrently arranged in the sealing area inspection station 5. In any event, in this case the infrared camera must be movable in direction 600 as well as in direction 601. However, this embodiment requires that there is sufficient time available for the camera 6 to take the infrared images of all individual primary packaging containers 1 concurrently arranged in the sealing area inspection station, as each individual infrared image is taken separately.

In the following, an embodiment is discussed how an infrared image of a primary packaging container 1 is evaluated, and how it is determined whether a sealing area is unacceptable for properly sealing a cover foil thereto (i.e. to the top surface thereof). In order to simplify this discussion, evaluation is explained with the aid of an infrared image of one primary packaging container 1 only although this holds for the evaluation of all primary packaging containers 1 (and this evaluation may be carried out concurrently for different individual primary packaging containers).

Figure 4:
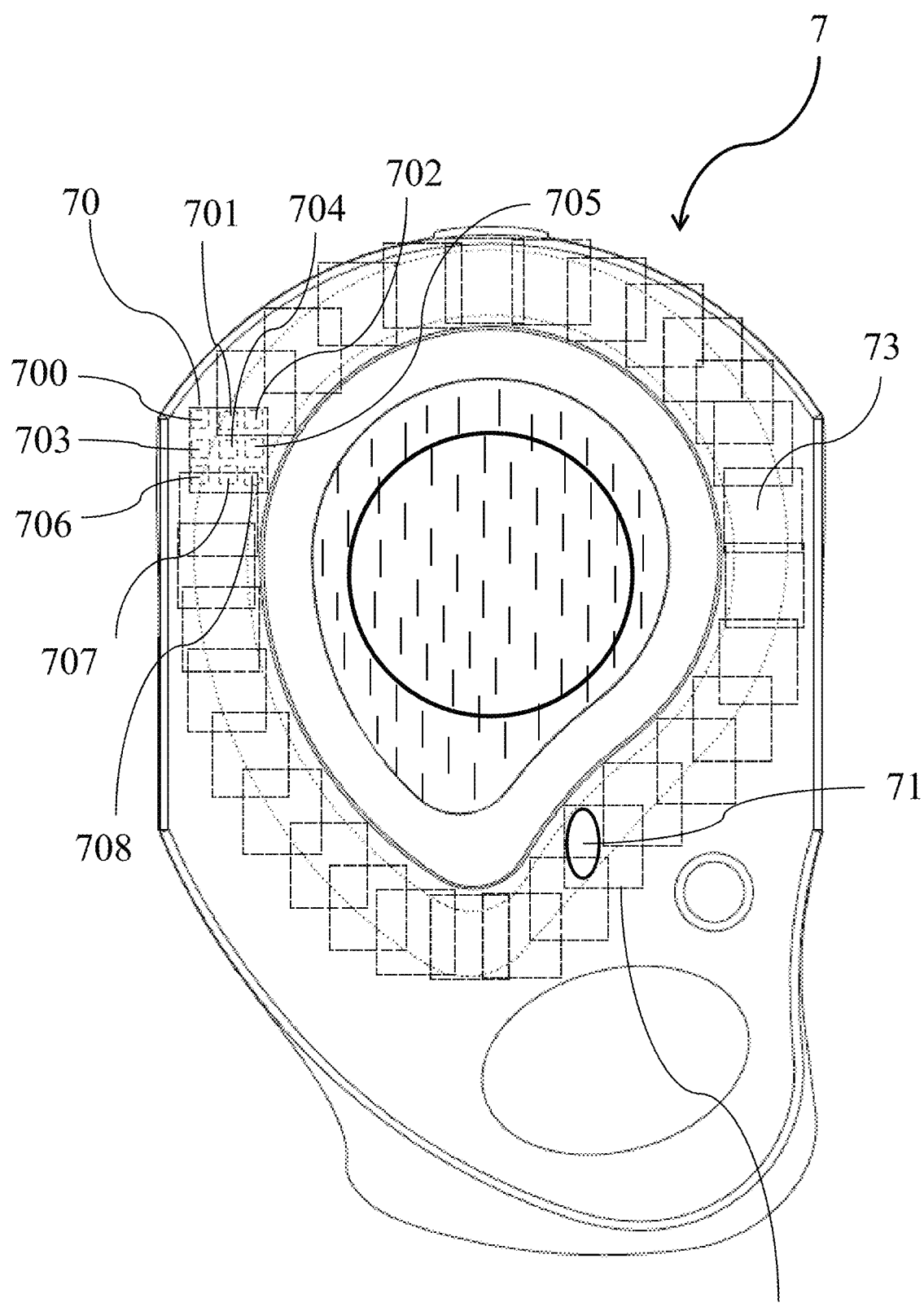
FIG. 4 shows (in principle) an infrared image of a primary packaging container with a droplet of storage and/or preservation liquid arranged on the sealing area.

FIG. 4 shows (in principle) an infrared image 7 of a primary packaging container 1 (for example, the regions of interest and the individual pixels are not visible in the infrared image, but are shown in FIG. 4 for illustrative purposes). For the sake of simplicity, in FIG. 4 only the portion of the infrared image 7 is shown that corresponds to the primary packaging container 1 (see FIG. 2), any other portions which may be present in the infrared image are not shown. Accordingly, infrared image 7 looks similar to primary packaging container 1 shown in FIG. 2 (as it is an image thereof). Infrared image 7 comprises an area 73 that corresponds to the sealing area 13 (see FIG. 2) which is indicated by the dotted lines. Also, the infrared image 7 shown in FIG. 4 contains image portions that correspond to the contact lens 3 and the liquid 4 contained in the bowl 10 of primary packaging container 1 shown in FIG. 2.

As can be seen further, infrared image 7 contains a plurality of individual regions of interest 70 which are arranged in a pattern along the area 73 in the infrared image 7 that corresponds to the sealing area 13 of primary packaging container 1 (see FIG. 2). In the embodiment shown in FIG. 4, the regions of interest 70 (which may or may not partially overlap) have the shape of a square, but this shape is by way of example and has been chosen for illustrative purposes only. Any other suitable shape for the region of interest 70 is possible as well. The pattern essentially covers the area 73 corresponding to the sealing area 13, however, as is also evident some minor portions are not covered by the pattern (this is to be understood in the sense that the area not covered by the pattern may amount up to 20% of the sealing area at maximum). These at maximum 20% which are not covered by the pixels are more or less evenly distributed along the sealing area.

Each individual region of interest 70 comprises a predetermined number of pixels. For example, as shown in FIG. 4 a region of interest may comprise nine individual pixels 700, 701, 702, 703, 704, 705, 706, 707 and 708, but may comprise any other suitable number of pixels. The temperature of the individual pixels must now be determined from the infrared image 7, and the infrared camera 6 may convert the temperatures of the individual pixels into gray scale levels. For example, for a temperature range that can be set in the infrared camera a number of two hundred and fifty six (0 . . . 255) gray scale levels may be provided, and the infrared camera 6 assigns the temperature of the respective individual pixel to the respective gray scale level (0 . . . 255).

By way of example, it is now assumed that the small droplet 41 of storage and/or preservation liquid 4 has been spilled so that it is arranged on the sealing area 13 of primary packaging container 1 and, accordingly, a corresponding feature 71 is contained in the infrared image 7. By way of example, this feature 71 may cover three pixels (pixels 700, 703, 706) of a particular region of interest 70. The temperature of the liquid of this droplet 41 is considerably lower than a reference temperature, and this reference temperature may be the temperature of the liquid 4 contained in the bowl 10 of primary packaging container 1 (see FIG. 2), as has already been explained in more detail above. Pixels 700, 703, 706 together represent a number of three coherently arranged pixels (a continuous area of pixels). Let us further assume that the temperature of each of these three pixels is $T_1$ and corresponds to the temperature of the liquid of the droplet 41 (although actually the temperatures of the three coherently arranged individual pixels 700, 703, 706 may slightly differ from one another). Accordingly, infrared camera 6 assigns gray scale level $GS_1$ to temperature $T_1$, whereas gray scale level $GS_0$ is assigned to reference temperature $T_0$ (which may have been obtained by the infrared camera through measurement of the temperature of the storage and/or preservation liquid 4 contained in the bowl 10 of primary packaging container 1).

Figure 5:
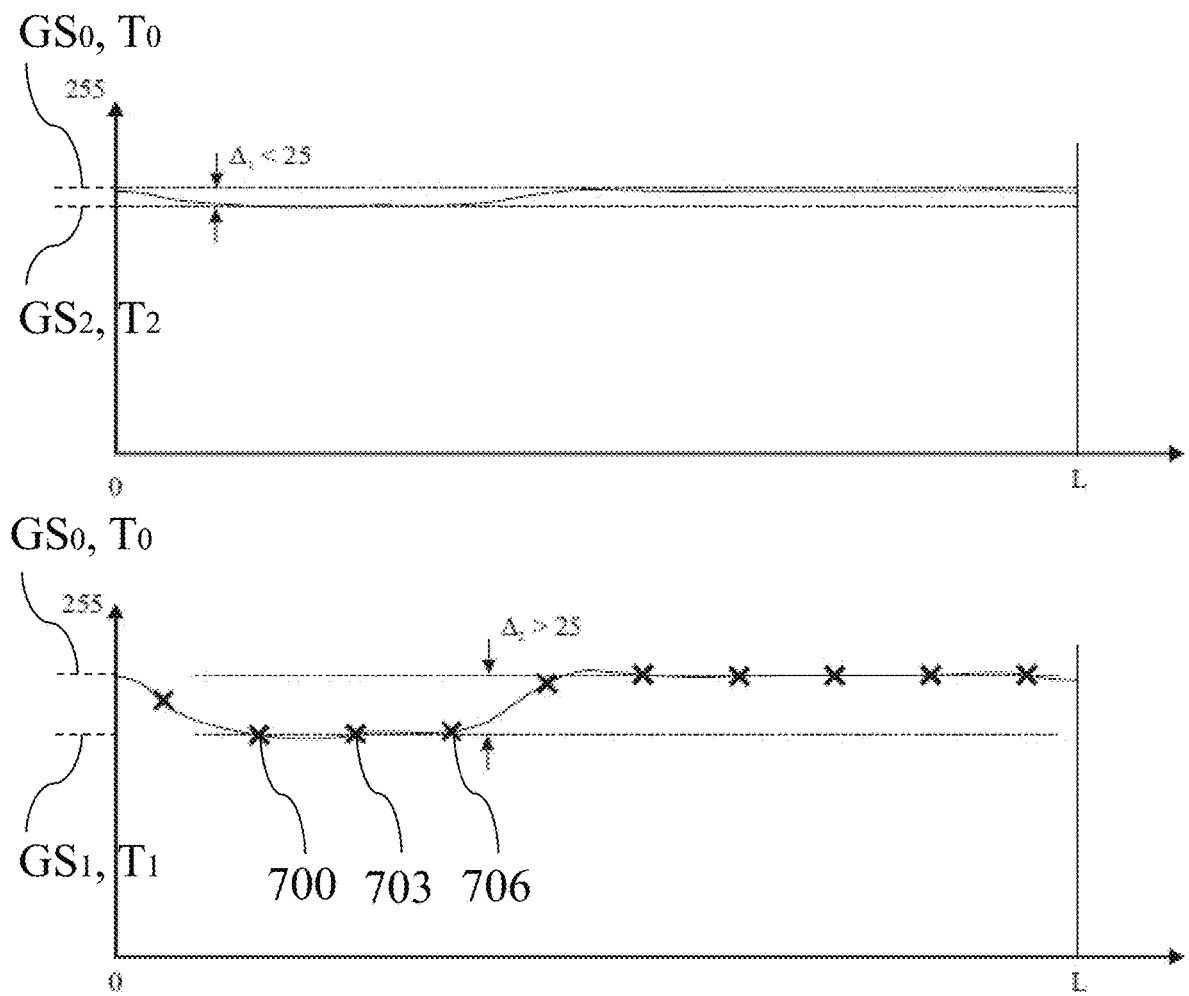
FIG. 5 shows two diagrams for two different regions of interest of the infrared image of FIG. 4.

FIG. 5 shows two diagrams representing the temperatures of two different regions of interest 70. The upper diagram represents a region of interest 70 where no spillage has occurred (for example that region of interest 70 in the infrared image 7 of FIG. 4 where the individual pixels 700-708 are explicitly shown), while the lower diagram of FIG. 5 represents the region of interest 70 in which feature 71 (corresponding to droplet 41) of the infrared image 7 of FIG. 4 is contained.

Ignoring the outermost left pixel in the said lower diagram nine pixels are shown in total, with those three pixels being assigned gray scale level $GS_1$ representing the temperature $T_1$ of pixels 700, 703, 706 of feature 71 whereas the remaining six pixels 701, 702, 704, 705, 707, 708 having assigned a different temperature which represent more or less the reference temperature $T_0$ and are consequently assigned gray scale level $GS_0$.

In a contact lens manufacturing line (including the packaging line) typically the temperature of the room where the manufacturing line is located is kept constant, for example this temperature is about 20° C. (although it may well be any other suitable temperature). The storage and/or preservation liquid 4 contained in the reservoir providing the storage and/or preservation liquid 4 also has the said temperature, so that the temperature of the storage and/or preservation liquid 4 dispensed into the bowl 10 of primary packaging container also is about 20° C. This holds similarly for the primary packaging containers 1 (plastic shells), as the magazine for providing the shells is also located in this room. Typically, therefore, if no spillage of storage and/or preservation liquid has occurred, any differences between the temperature $T_2$ of the individual pixels representing the temperature of the sealing area 13 and the reference temperature $T_0$ should be small, if any. This scenario is represented in the upper diagram of FIG. 5 where the difference in temperature is only small (for example considerably below twenty-five gray scale levels) and, correspondingly, the difference between gray scale level $GS_2$ and gray scale level $GS_0$ is small. Individual pixels are not shown in the upper diagram of FIG. 5. For example, the upper diagram of FIG. 5 shows the temperatures in that region of interest 70 in which the individual pixels 700-708 are explicitly shown in FIG. 4.

In contrast thereto, the lower diagram in FIG. 5 shows the temperatures in that region of interest 70 containing feature 71 (which is the region of interest 70 corresponding to that portion of sealing area 13 where droplet 41 is located). It can be seen there that the difference between the gray scale level $GS_1$ assigned to temperature $T_1$ (representing the temperature of the three coherently arranged individual pixels 700, 703, 706 all having about the same temperature) and the gray scale level $GS_0$ assigned to reference temperature $T_0$ is larger than the predetermined threshold in gray-levels (this threshold may be twenty-five gray scale levels, for example).

In order to determine that the sealing area 13 of the primary packaging container 1 is unacceptable for properly sealing the cover foil thereto, the predetermined number of coherently arranged pixels which must have a temperature lower than the reference temperature by at least the threshold for the temperature difference (i.e. for which the difference in gray scale levels is larger than twenty-five gray scale levels) may be set to three pixels. This means that in case only two coherently arranged pixels or only one pixel has a temperature that is lower than the reference temperature by more than the threshold for the temperature difference, no determination can be made to the extent that the sealing area 13 of the primary packaging container 1 is unacceptable for properly sealing the cover foil thereto.

As has already been discussed above, due to evaporation of the storage and/or preservation liquid of droplet 41 to the ambient air the temperature at the location of droplet 41 decreases. This decrease in temperature occurs comparatively quick as the volume of droplet 41 in relation to the surface of droplet 41 is small. This is in particular the case when the temperature of the storage and/or preservation liquid of droplet 41 is compared with the large volume of liquid 4 contained in bowl 10 of primary packaging container 1. Therefore, the temperature of the storage and/or preservation liquid 4 contained in bowl 10 decreases significantly slower than the temperature of the liquid of droplet 41 located on the sealing area 13.

The temperature of the storage and/or preservation liquid 4 contained in bowl 10 of the individual primary packaging container 1 may be determined from the infrared image 7 and may be used as the reference temperature $T_0$ for the respective individual primary packaging container 1. Since the temperature of droplet 41 on sealing area 13 is considerably lower (see above), this allows for an improved dynamic setting of the reference temperature $T_0$ for each individual primary packaging container 1.

Turning back to FIG. 5 and assuming that droplet 41 on the sealing area 13 (corresponding to feature 71 in FIG. 4) is large enough so that the region of interest 70 containing feature 71 (corresponding to the droplet) meets the conditions discussed above (the number of pixels each having a temperature $T_1$ lower than the reference temperature $T_0$ by at least the threshold for the temperature difference), it is determined that sealing area 13 of the primary packaging container 1 is unacceptable for properly sealing the cover foil thereto (i.e. to the top surface thereof). Depending on the size of the individual regions of interest 70 the determination that sealing area 13 is unacceptable may be made only in case the above-discussed conditions are fulfilled for a predetermined number of coherent regions of interest 70. However, this predetermined number of coherent regions of interest 70 may be set to one, as has been described in the embodiment.

It may be advantageous that evaluation of the individual regions of interest 70 is carried out concurrently in a plurality of individual regions of interest 70 of the infrared image 7. For example, if—during evaluation—the conditions discussed above are met for one single region of interest 70 then further evaluation of the other regions of interest 70 may be terminated and it is determined that the sealing area 13 of this primary packaging container 1 is unacceptable for sealing the cover foil thereto.

As has been discussed above, the individual primary packaging container 1 the sealing area 13 of which has been determined to be unacceptable (or the strip of primary packaging containers comprising the said primary packaging container 1 the sealing area 13 of which has been determined to be unacceptable) is then sorted out, either directly after inspection of the sealing area 13 (i.e. at the sealing area inspection station 5) or further downstream in the packaging process/packaging line. For example, depending on the set-up/configuration of the packaging process/packaging line it may be more suitable that the sealing step (and possibly additional packaging steps) is/are still performed despite the sealing area 13 of the primary packaging container 1 having been determined to be unacceptable. In this case, the sorting-out of the primary packaging container 1 (or of the strip of primary packaging containers comprising the said primary packaging container 1) is performed further downstream in the packaging process/packaging line.

An embodiment of the invention has been described above with the aid of the drawings. However, the invention is not limited to the embodiment described, but rather various modifications and alterations are understood by the person skilled in the art to be comprised by the invention without departing from the teaching thereof. The scope of protection is therefore defined by the appended claims.

The invention claimed is:

1. In a process for sealing an ophthalmic lens in a primary package container, a method for determining whether a sealing area (13) of the primary packaging container (1) is unacceptable for properly sealing a foil to the sealing area (13) that completely surrounds an opening (12) of a bowl (10) of the primary packaging container (1), with the bowl (10) containing a liquid (4), the method comprising the steps of
  taking an infrared image (7) of the primary packaging container (1) using an infrared camera (6);
  determining from the infrared image (7) a temperature of a plurality of individual pixels (700-709) which are arranged along an area (73) corresponding to the sealing area (13) of the primary packaging container (1), the plurality of individual pixels together essentially covering the area (73) corresponding to the sealing area (13), and
  determining that the sealing area (13) of the primary packaging container (1) is unacceptable for properly sealing the foil thereto in case the following conditions are fulfilled:
  a) the temperature ($T_1$) of each individual pixel of a predetermined number of coherently arranged individual pixels (700, 703, 706) is lower than a reference temperature ($T_0$), and
  b) the difference between the temperature ($T_1$) of each individual pixel (700; 703; 706) of the predetermined number of coherently arranged individual pixels (700, 703, 706) and the reference temperature ($T_0$) exceeds a predetermined threshold.

2. Method according to claim 1, further comprising the steps of
  determining from the infrared image (7) the temperature of the liquid (4) contained in the bowl (10) of the primary packaging container (1), and
  using the temperature of the liquid (4) contained in the bowl (10) of the primary packaging container (1) as the reference temperature ($T_0$).

3. Method according to claim 1, wherein the step of determining that the sealing area (13) of the primary packaging container (1) is unacceptable for properly sealing the foil thereto comprises
  concurrently determining in a plurality of the individual regions of interest (70) of the pattern whether conditions a) and b) are fulfilled for the predetermined number of pixels comprised by each of the plurality of individual regions of interest (70), and
  determining that the sealing area (13) of the primary packaging container (1) is unacceptable for properly sealing the foil thereto once in a predetermined number of coherent individual regions of interest (70) it has been determined that conditions a) and b) are fulfilled.

4. Method according to claim 3, wherein the predetermined number of pixels comprised by each individual region of interest (70) is nine or higher.

5. Method according to claim 1, wherein the threshold for the difference between the temperature ($T_1$) of each individual pixel of the predetermined number of coherently arranged individual pixels (700, 703, 706) and the reference temperature ($T_0$) is at least 1° C., in particular at least 2° C.

6. Method according to claim 1, wherein the temperature ($T_1$) of the respective individual pixels as well as the reference temperature ($T_0$) is assigned a respective gray scale level by the infrared camera (6), and wherein the sealing area (13) of the primary packaging container (1) is determined to be unacceptable for properly sealing the foil thereto in case the difference in gray scale levels between that gray scale level representing the reference temperature ($T_0$) and those gray scale levels representing the temperatures ($T_1$) of the coherently arranged individual pixels exceeds a predetermined difference in gray scale levels representing the predetermined threshold.

7. Method according to claim 1, further comprising the steps of
arranging a plurality of the primary packaging containers (1) on a carrier (2);
transporting the carrier (2) with the plurality of the primary packaging containers (1) arranged thereon along a track (50) to a sealing area inspection station (5);
interrupting transportation of the carrier (2) once the carrier (2) has reached the sealing area inspection station (5) where the infrared camera (6) is fixedly arranged above the track (50) and has a field of view (60) extending over the plurality of primary packaging containers (2) arranged on the carrier (2) in the sealing area inspection station (5); and
simultaneously taking an infrared image of the plurality of primary packaging containers (1) arranged on the carrier (2) in the sealing area inspection station (5) using the fixedly arranged infrared camera (6).

8. Method according to claim 7, wherein a plurality of the said carriers (2) are arranged on a plurality of parallel running tracks (50), wherein on each individual carrier (2) of the plurality of carriers a said plurality of primary packaging containers (1) is arranged, and wherein the infrared camera (6) fixedly arranged in the sealing area inspection station (5) has a field of view (60) extending over all of the said primary packaging containers (1) arranged on all of the said carriers (2) arranged in the sealing area inspection station, the method further comprising the steps of
transporting the individual carriers (2) of the plurality of carriers on the plurality of parallel running tracks (50) until a predetermined number of said individual carriers (2) has reached the sealing area inspection station (5) on the parallel running tracks (50), and
simultaneously taking an infrared image of all primary packaging containers (1) arranged on all carriers (2) arranged in the sealing area inspection station using the fixedly arranged infrared camera (6).

9. Method according to claim 1, further comprising the steps of
arranging a plurality of the primary packaging containers (1) on a carrier (2);
transporting the carrier (2) with the plurality of the primary packaging containers (1) arranged thereon along a track (50) to a sealing area inspection station (5) where the infrared camera (6) is movably arranged above the track (50);
interrupting transportation of the carrier (2) once the carrier (2) has reached the sealing area inspection station (5);
moving the infrared camera (6) along the carrier (2) and consecutively taking an infrared image (7) of each of the individual primary packaging containers (1) arranged on the carrier (2).

10. Method according to claim 9, wherein a plurality of the said carriers (2) are arranged on a plurality of parallel running tracks (50), wherein on each of the said carriers (2) a said plurality of primary packaging containers (1) is arranged, and wherein a plurality of infrared cameras (6) is arranged in the sealing area inspection station (5), one said infrared camera (6) above each of the plurality of parallel running tracks (50), the method further comprising the steps of
transporting the plurality of carriers (2) on the plurality of parallel running tracks (50) until a said carrier (2) of the plurality of carriers has reached the sealing area inspection station (5) on a said track (50) of the plurality of parallel running tracks;
moving the respective infrared camera (6) arranged above the said track (50) along the said carrier (2) that has reached the sealing area inspection station (5) on the said track (50), and consecutively taking an infrared image (7) of each of the primary packaging containers (1) arranged on the said carrier (2).

11. Method according to claim 1, further comprising the steps of
arranging a plurality of carriers (2) on a plurality of parallel running tracks (50), each of the said carriers (2) of the plurality of carriers having a plurality of the said primary packaging containers (1) arranged thereon;
transporting the plurality of carriers (2) with the said primary packaging containers (1) arranged thereon on the plurality of parallel running tracks (50) to a sealing area inspection station (5);
interrupting transportation of a said carrier (2) of the plurality of carriers once the said carrier (2) has reached the sealing area inspection station (5) where at least one said infrared camera (6) is movably arranged above the plurality of parallel running tracks (50);
once a predetermined number of said carriers (2) has reached the sealing area inspection station (5) on different ones of the plurality of parallel running tracks (50), moving the at least one infrared camera (6) in a direction (601) transverse to the parallel running tracks (50) over the primary packing containers (1) arranged on the predetermined number of said carriers (2) arranged in the sealing area inspection station (5) and consecutively taking an infrared image (7) of each of the individual primary packaging containers (1) arranged on the different carriers (2) across which the at least one infrared camera (6) is moved.

* * * * *